United States Patent
Sai et al.

(10) Patent No.: US 7,525,747 B2
(45) Date of Patent: Apr. 28, 2009

(54) DATA STORAGE DEVICE, DATA STORAGE CONTROL CIRCUIT, AND CONTROL METHOD FOR MAGNETIC DISK DRIVE

(75) Inventors: Fuminori Sai, Kanagawa (JP); Naoyuki Minami, Kanagawa (JP); Hiroshi Kawanobe, Kanagawa (JP); Hidenobu Hanami, Kanagawa (JP)

(73) Assignee: Hitachi Global Storage Technologies Netherlans B.V., Amsterdam (NL)

( * ) Notice: Subject to any disclaimer, the term of this patent is extended or adjusted under 35 U.S.C. 154(b) by 288 days.

(21) Appl. No.: 11/341,261

(22) Filed: Jan. 26, 2006

(65) Prior Publication Data
US 2006/0171053 A1 Aug. 3, 2006

(30) Foreign Application Priority Data
Feb. 1, 2005 (JP) ............................. 2005-024997

(51) Int. Cl.
G11B 20/10 (2006.01)
(52) U.S. Cl. ...................................................... 360/46
(58) Field of Classification Search ....................... None
See application file for complete search history.

(56) References Cited

U.S. PATENT DOCUMENTS

| | | | | |
|---|---|---|---|---|
| 6,445,522 B1 * | 9/2002 | Tsunoda et al. | ................ | 360/46 |
| 6,563,656 B2 * | 5/2003 | Tsunoda et al. | ................ | 360/46 |
| 6,581,124 B1 * | 6/2003 | Anand | ......................... | 710/305 |
| 6,754,780 B1 * | 6/2004 | Carlson et al. | ............... | 711/137 |
| 6,820,140 B2 * | 11/2004 | Bissessur et al. | ................ | 710/5 |
| 6,868,515 B2 * | 3/2005 | Hanson | ....................... | 714/755 |
| 7,199,954 B2 * | 4/2007 | Lee et al. | ....................... | 360/39 |
| 7,281,065 B1 * | 10/2007 | Lam et al. | ...................... | 710/33 |
| 7,461,183 B2 * | 12/2008 | Ellis et al. | ...................... | 710/35 |
| 2003/0002191 A1 * | 1/2003 | Stanek et al. | .................. | 360/65 |
| 2003/0067699 A1 * | 4/2003 | Thomson et al. | ............... | 360/46 |
| 2003/0147165 A1 * | 8/2003 | Damron et al. | ................ | 360/31 |
| 2004/0240095 A1 | 12/2004 | Igari | | |
| 2005/0013028 A1 * | 1/2005 | Lee et al. | ....................... | 360/46 |
| 2006/0064516 A1 * | 3/2006 | Ellis et al. | ...................... | 710/22 |

FOREIGN PATENT DOCUMENTS

JP 2001-167524 6/2001

* cited by examiner

*Primary Examiner*—Hoa T Nguyen
*Assistant Examiner*—James L Habermehl
(74) *Attorney, Agent, or Firm*—Townsend and Townsend and Crew LLP; Patrick Duncan (57) ABSTRACT

Embodiments of the invention prevent erroneous writing/readout onto/from magnetic disks or other recording disks, even when data transfer between a controller such as an HDC, and a channel such as an R/W channel, and the read/write operation performed by the channel do not match each other in timing. In one embodiment, an HDC/MPU outputs to an R/W channel a starting instruction for data transfer to/from a head, and data that indicates data length of data to be transferred. In response to the data transfer starting instruction from the HDC/MPU, the R/W channel starts transferring, to/from the head, recorded data of the data length notified from the HDC/MPU.

20 Claims, 7 Drawing Sheets

DATA STORAGE DEVICE, DATA STORAGE CONTROL CIRCUIT, AND CONTROL METHOD FOR MAGNETIC DISK DRIVE

CROSS-REFERENCES TO RELATED APPLICATIONS

This application claims priority from Japanese Patent Application No. JP2005-024997, filed Feb. 1, 2005, the entire disclosure of which is incorporated herein by reference.

BACKGROUND OF THE INVENTION

The present invention relates to data storage devices such as a hard-disk drive (HDD), and more particularly to a data storage device that does not match in timing between data transfer from a controller such as a hard-disk controller (HDC), to a channel such as a read/write (R/W) channel, or vice versa, and the access (read/write) operation performed by the channel.

Devices using various types of media such as optical disks and magnetic tapes are known in the art as recording media drives provided in the interior or the exterior of information processing apparatuses. Among them, hard disk drives (hereinafter referred to as HDDs) have become popular as storage devices for information processing apparatuses to such an extent that they are one type of the storage devices indispensable for today's information processing systems. Further, not limited to the information processing apparatuses as described above, HDDs are expanding more and more in application. For example, HDDs are used for moving picture recording/reproducing devices, car navigation systems, cellular phones, and removable memories for use in them.

These HDDs record on magnetic disks the user data transferred from PCs or other hosts, read out the user data recorded on the magnetic disks, and transfer the data to the hosts. The magnetic disks used in an HDD each have a plurality of concentrically formed tracks. The regions in which servo data that is the address information required for the positioning of a magnetic head is recorded (i.e., servo regions) are arranged intermittently across tracks, and the regions between servo regions function as data regions in which user data and the like will be recorded. Also, one data region sandwiched between servo regions includes a plurality of sectors, and the head can access desired data sectors by using servo data to perform user data read/write operations on the sectors. When data is recorded, one data sector may be split into two sections across a servo region. Such sectors are called split sectors.

Read/write operation of the HDD with respect to a magnetic disk thereof is controlled by a data storage control circuit (more specifically, an HDC and an R/W channel). When a write operation is performed on the magnetic disk, the hard-disk controller (HDC) of the HDD receives user data from a host and then adds an error correction code (ECC) to the received user data. The user data to which ECC has been added is transferred from the HDD through a data bus of about 10 bits, called the NRZ (Non-Return to Zero) bus, to the read/write (R/W) channel. Hereinafter, the user data transferred in an ECC-added condition from the HDD to the R/W channel is called NRZ data. The R/W channel performs an encoding process to convert the NRZ data that has been received from the HDC, into a data format (channel codes) suitable for recording on the magnetic disk. Encoded data is written onto the magnetic disk by the head.

For conventional HDDs, since a writing delay time associated with an encoding process or the like by an R/W channel and a readout delay time associated with a decoding process are not too long, an HDC allows for a delay time subsequent to R/W channel processing and outputs a Write Gate (WG) signal and a Read Gate (RG) signal. Thus, the timing of data transfer between the HDC and the R/W channel and the timing of physical writing onto/readout from a magnetic disk are controlled (refer to, for example, Patent Document 1 (Japanese Patent Laid-open No. 2001-167524) and Patent Document 2 (Japanese Patent Laid-open No. 2004-234779)).

For writing onto the magnetic disk, a write instruction based on the WG signal is given and at the same time, the NRZ data to be written is transferred from the HDC to the R/W channel. Next, the R/W channel provides the NRZ data with an encoding process and a data conversion process such as conversion into serial data, whereby the NRZ data is actually written onto the magnetic disk. For data readout from the magnetic disk, the R/W channel initiates the data readout, pursuant to a readout command based on the RG signal, and then conducts required signal processing such as waveform shaping and decoding. The NRZ data that has thus been restored to its original format is transferred from the R/W channel to a host.

Decoding in the R/W channel, however, tends to be complicated for improved restoration accuracy of the data read out by the R/W channel, and this is creating a tendency for a decoding delay time to further increase. Along with this, the code block length, which is the data unit of encoding, also increases. In addition, an encoding delay time in the R/W channel tends to increase as a result.

If the encoding delay time and decoding delay time in the R/W channel actually increase in this way, in write mode, for example, there will be an even greater difference in time from the start of NRZ data transfer to the R/W channel by the HDC after it has issued a write instruction based on the WG signal, to physical writing onto the magnetic disk. In readout mode, there will also be an even greater difference in time from the start of physical reading from the magnetic disk after a readout instruction based on the RG signal has been issued, to the start of NRZ data transfer from the R/W channel.

If the encoding delay time and decoding delay time in the R/W channel increase as mentioned above, the write operation and the readout operation cannot be sufficiently controlled in the conventional control method that uses the WG and RG signals to define both the write/readout instruction to the R/W channel and the start of NRZ data transfer.

Accordingly, studies are being performed on a method of controlling independently the timing of NRZ data transfer between the HDC and the R/W channel, and the timing of the read/write operation by the R/W channel. More specifically, this method uses a signal that defines the data transfer timing independently of the WG and RG signals. In write mode, for example, data transfer from the HDC to the R/W channel is started prior to the issuance of a write instruction based on the WG signal.

BRIEF SUMMARY OF THE INVENTION

As described above, using a data transfer timing signal independent from the WG signal makes it possible to start data transfer from the HDC to the R/W channel prior to the write operation. However, if NRZ data transfer between the HDC and the R/W channel and an actual read/write operation do not match in timing and are performed separately, this will pose the following problems.

The R/W channel is not such that it needs only to read/write one sector of data at a time. To write onto split sectors, it is necessary that in order to prevent associated servo regions from being overwritten, the R/W channel be made to recognize the timing at which the write operation is to be terminated in front of the servo region. With conventional technology, it has been possible to prevent erroneous writing into servo regions by making the HDC notify write termination timing to the R/W channel by means of the WG signal and stop the transfer of data to the R/W channel.

However, if the data transfer precedes an actual write operation independently of the WG signal, the R/W channel cannot stop the write operation since the NRZ data transfer has been already finished. Accordingly, erroneous writing is likely to occur if the NRZ data transfer between the HDC and the R/W channel and the actual read/write operation do not match in timing and are performed separately.

To read out data from split sectors, it is also necessary, as in write mode, to make the R/W channel recognize the termination timing of readout so that associated servo regions will be excluded from the readout operation.

The present invention was made for solving these problems, and a feature of the invention is to provide a data storage device and data storage control circuit capable of preventing erroneous writing onto/erroneous readout from magnetic disks or other recording disks, even when data transfer between a controller such as an HDC, and a channel such as an R/W channel, and the read/write operation performed by the channel do not match in timing; and a data storage device control method that allows the prevention of the above.

A data storage device according to an aspect of the present invention includes: a head for accessing a recording disk in order to write data to be recorded on the disk and/or read out recorded data therefrom; a channel for exchanging the recorded data with the head and performing a data conversion on the recorded data; and a controller for exchanging the recorded data with the channel and controlling an exchange of the recorded data between the channel and the head; wherein the controller outputs to the channel, a starting instruction for a data exchange with the head, and data that indicates data length of recorded data to be exchanged, and in response to the data transfer starting instruction from the controller, the channel starts exchanging with the head the recorded data of the data length specified in the data that indicates data length.

A data storage control circuit according to the present invention includes: a channel that exchanges the recorded data with a head for accessing a recording disk in order to write data to be recorded on the disk and/or read out recorded data therefrom, and performs a data conversion on the recorded data; and a controller for exchanging the recorded data with the channel and controlling an exchange of the recorded data between the channel and the head; wherein the controller outputs, to the channel, a starting instruction for a data exchange with the head, and data that indicates data length of recorded data to be exchanged, and in response to the data transfer starting instruction from the controller, the channel starts exchanging with the head the recorded data of the data length indicated in the data that indicates data length.

The foregoing data specifies the data length of the recorded data to be transferred between the controller and the channel, and the transfer may be via a parallel signal lines provided between the controller and the channel.

In such circuit composition, the channel needs only to write the length data notified from the controller, and can autonomously determine termination timing of writing onto the recording disk, independently of the timing signal, such as a WG signal, that is sent from the controller. Erroneous writing onto a recording medium such as a magnetic disk, therefore, can be prevented, even when data transfer between the controller such as an HDC, and the channel such as an R/W channel, and the read/write access operation performed by the channel do not match each other in timing.

Also, it is desirable that when accessing split sectors on which the recorded data is recorded as a plurality of split sets of data, the controller should output each split set of data independently. In such circuit composition, erroneous writing onto the recording medium such as a magnetic disk can be prevented, even when one sector is recorded in a split format according to particular layout of servo regions and the like on the recording medium. Data transfer from channel to controller in the readout operation from split sectors can also be conducted independently of a timing signal such as an RG signal.

It is also desirable that each time the controller outputs the foregoing starting instruction to the channel, the controller should output the foregoing data to the channel. Such circuit composition makes it possible to simplify channel processing, because the channel can always operate in accordance with the data length indicated in the foregoing data.

The channel can detect an error in the data length indicated in the foregoing data, and notify the controller of the data length error. Such circuit composition makes it possible to prevent abnormal accessing in case of erroneous writing with indicated wrong data length.

In addition, on the basis of the data length error notification from the channel, the controller may instruct the channel to stop the transfer of the recorded data to the head.

It is desirable that when accessing split sectors on which the recorded data is recorded as a plurality of split sets of data, the controller should output a split-sector notification signal to the channel. Such circuit composition makes it possible for the channel to operate recognizing the split sectors, and is valid for purposes such as detecting data length errors.

Furthermore, it is desirable that when accessing split sectors on which the recorded data is recorded as a plurality of split sets of data, the controller should output to the channel a signal indicative of the last of the plural sets of data. Such circuit composition makes it possible for the channel to operate recognizing the split sectors, and is valid for purposes such as detecting data length errors.

It is desirable that the controller and the channel be stacked on a single bare IC chip. Such circuit composition alleviates limitations on increases in the quantity of wiring, thus facilitating electrical connection between the controller and the channel.

According to a present invention, there is provided a method of controlling a magnetic disk drive including: a head for accessing a magnetic disk in order to write data to be recorded on the disk and/or read out recorded data therefrom; a channel for exchanging the recorded data with the head and performing a data conversion on the recorded data; and a controller for exchanging the recorded data with the channel and controlling an exchange of the recorded data between the channel and the head. This method includes: outputting data that indicates data length of recorded data to be exchanged, together with a starting instruction for a data exchange with the head, from the controller to the channel; and allowing the channel responsive to the data transfer starting instruction from the controller to start exchanging with the head the recorded data of the data length specified in the data that indicates data length.

Thus, the channel needs only to write the length data notified from the controller, and can autonomously determine termination timing of writing onto the recording disk, independently of the timing signal, such as a WG signal, that is sent from the controller. Erroneous writing onto a recording medium such as a magnetic disk, therefore, can be prevented, even when data transfer between the controller such as an HDC, and the channel such as an R/W channel, and the read/write access operation performed by the channel do not match each other in timing.

The present invention makes it possible to provide a data storage device and data storage control circuit capable of preventing erroneous writing onto/erroneous readout from magnetic disks or other recording disks, even when data transfer between a controller such as an HDC, and a channel such as an R/W channel, and the read/write operation performed by the channel do not match each other in timing; and a data storage device control method that allows the prevention of the above.

DETAILED DESCRIPTION OF THE INVENTION

A specific embodiment that applies the present invention is described in detail below with reference to the accompanying drawings. In the present embodiment, the present invention is applied to an HDD.

Figure 1:
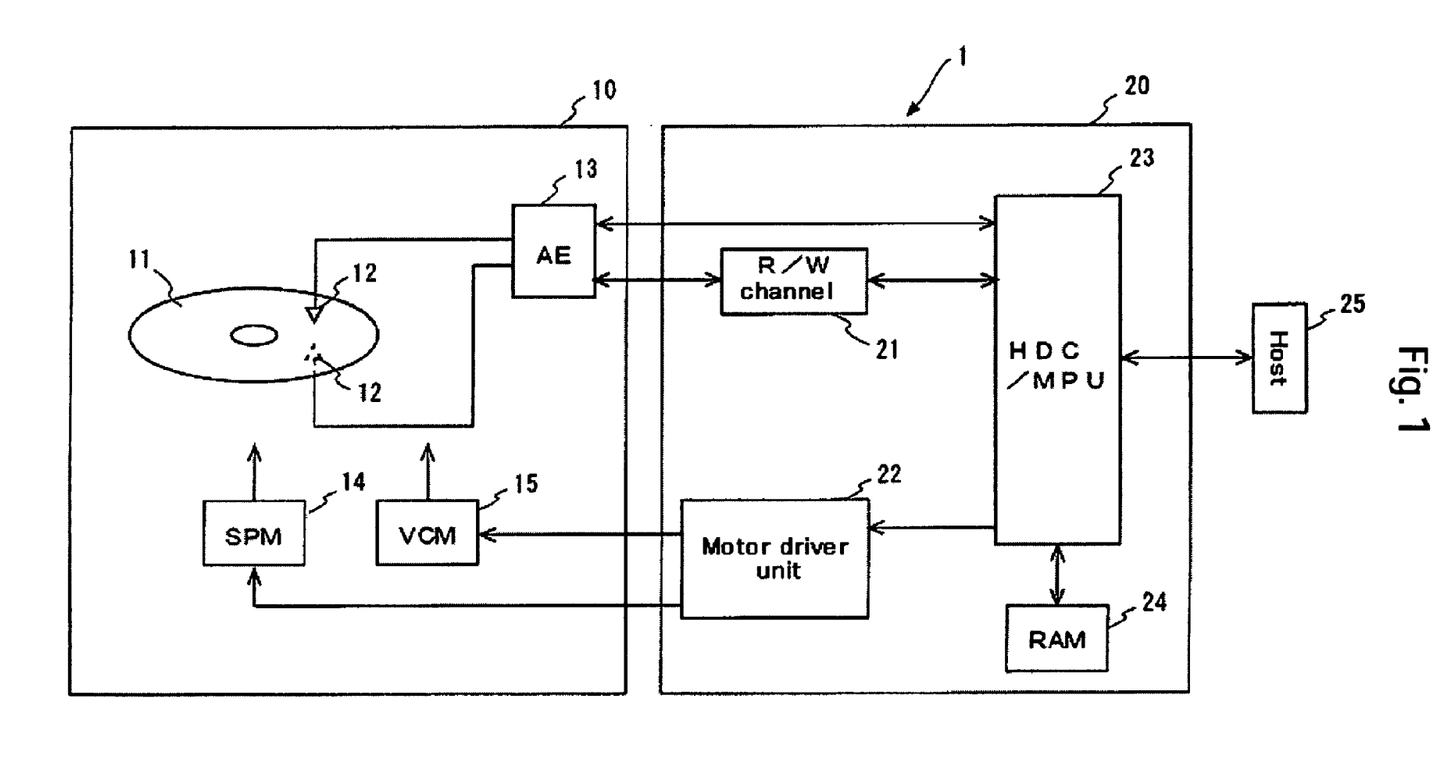
FIG. 1 is a block diagram showing a schematic configuration of an HDD according to an embodiment of the present embodiment.

FIG. 1 is a functional block diagram showing a schematic configuration of an HDD 1 according to the present embodiment. The HDD 1 has, in an enclosure 10 a magnetic disk 11 that is an example of a recording disk, a head 12, arm electronics (AE) 13, a spindle motor (SPM) 14, and a voice coil motor (VCM) 15.

Also, the HDD 1 has a circuit board 20 fixed to the outside of the enclosure 10. The circuit board 20 has various ICs such as an R/W channel 21 that is an example of a channel, a motor driver unit (MDU) 22, an HDC/MPU integrated circuit (hereinafter, referred to simply as HDC/MPU) 23 that is an example of a controller, and a RAM 24 as an example of a memory. These circuits can be integrated into one IC or mounted as a plurality of independent ICs.

Write data from a host 25 is received by the HDC/MPU 23 and then written onto the magnetic disk 11 by the head 12 via the R/W channel 21 and the AE 13. Also, data that is prestored on the magnetic disk 11 is read out by the head 12, and data that has thus been read out is output from the HDC/MPU 23 to the host 25 via the AE 13 and the R/W channel 21. The host 25 here is a PC or any other information-processing apparatus that exists externally to the HDD 1 and instructs the HDD 1 to save and read out data.

Next, constituent elements of the HDD 1 are described below. A driving mechanism for driving the magnetic disk 11 and the head 12 is first outlined with reference to FIG. 2. The magnetic disk 11 is fixed to a hub of the SPM 14. The SPM 14 rotates the magnetic disk 11 at a required speed. The motor driver unit 22 drives the SPM 14 in accordance with the control data sent from the HDC/MPU 23. The magnetic disk 11 in the present embodiment has, on both faces, recording surfaces for recording data, and heads 12 (see FIG. 1) are provided to be associated with the respective recording surfaces.

Figure 2:
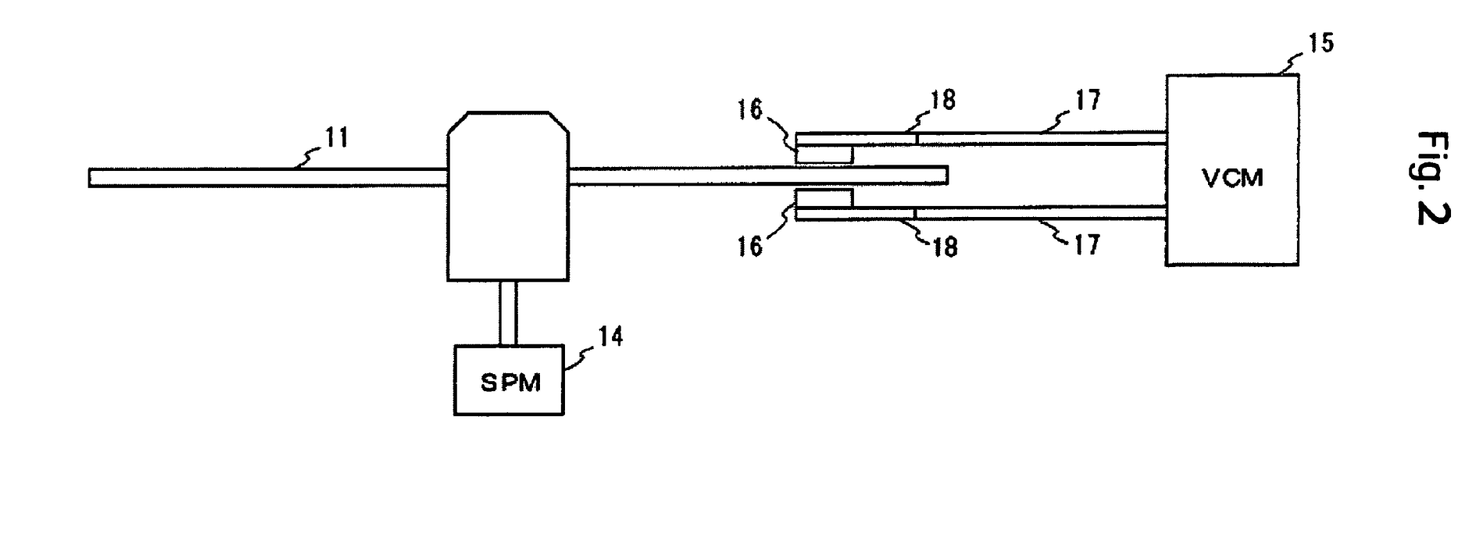
FIG. 2 is a schematic view showing a driving mechanism of the magnetic disk and head element section in the embodiment of the present invention.

The heads 12 are each fixed to a slider 16, which is further fixed to a front end of a suspension 18. The suspension 18 is fixed to a carriage 17. The carriage 17 is fixed to the VCM 15, which oscillates to move the suspension 18, the slider 16, and the head 12. The motor driver unit 22 drives the VCM 15 in accordance with the control data sent from the HDC/MPU 23.

In order to read and write data from and onto the magnetic disk 11, the carriage 17 causes the slider 16 and the head 12 to move above a data region on the surface of the rotating magnetic disk 11. The pivotal movement of the carriage 17 moves the slider 16 and the head 12 radially along the surface of the magnetic disk 11. Thus, the head 12 can access a desired region.

The head 12 starts to fly with a fixed gap above the magnetic disk 11 when a pressure due to viscosity of air between the rotating magnetic disk 11 and the air-bearing surface (ABS) of the slider 16 that faces the magnetic disk 11 balances with the force applied in a direction of the magnetic disk 11 by the head 12.

Next, circuits are described below with reference back to FIG. 1. The AE 13 selects one of the plural heads 12 to access data, then preamplifies with a fixed gain the readout signals read by a read head of the selected head 12, and sends the signals to the R/W channel 21. The AE 13 sends the write signals that it has received from the R/W channel 21, to a write head of the selected head 12.

For data writing, the R/W channel 21 performs code modulations on the NRZ data supplied from the HDC/MPU 23, and after reconverting the code-modulated NRZ data into write signals, supplies the write signals to the AE 13. For data readout, the readout signals that have been supplied from the AE 13 are preamplified for fixed amplitude, then extracts data from the acquired readout signals, and decodes the data. The NRZ data, after being restored by decoding, is transferred to the HDC/MPU 23.

The HDC/MPU 23 executes positioning control of the head 12, interface control, defect management, and other types of processing required for data processing. The HDC/MPU 23 also controls the entire HDD 1. The MPU operates in accordance with the microcodes that were loaded into the RAM 24. When the HDD 1 is started up, the microcodes that operate on the MPU, and the data required for control and data processing are loaded from the magnetic disk 11 or a ROM (not shown) into the RAM 24.

The HDC/MPU 23 functions as an interface to the host 25, and receives not only the user data transferred from the host 25, but also commands such as a read command and a write command, therefrom. Received user data is transferred as NRZ data to the R/W channel 21. During readout processing, the HDC/MPU 23 performs an error correction coding (ECC) process on the NRZ data that has been acquired from the R/W channel 21, and transmits user data to the host 25.

The data transferred from the R/W channel 21 to the HDC/MPU 23 by readout processing includes servo data in addition to user data. The HDC/MPU 23 uses servo data to conduct positioning control of the head 12. Control data from the HDC/MPU 23 is output to the motor driver unit 22. The motor driver unit 22 supplies a driving electric current to the VCM 15 in response to a control signal from the HDC/MPU 23. The HDC/MPU 23 also uses servo data to control a data read/write process.

Figure 3:
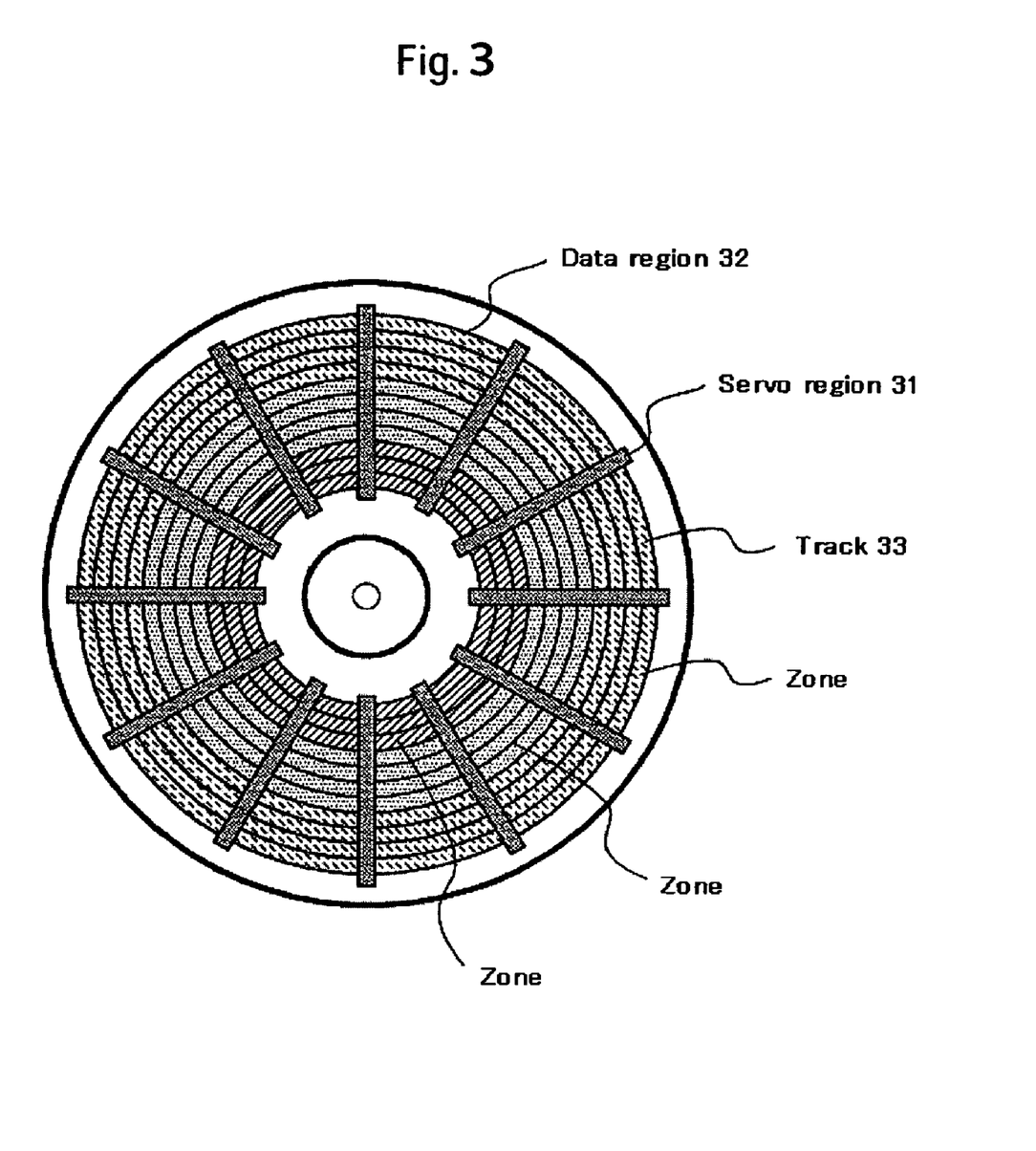
FIG. 3 is a diagram showing schematically a state of the data recorded on a recording face of the magnetic disk in an embodiment of the present invention.

FIG. 3 schematically shows a state of the data recorded on a recording face of the magnetic disk 11. As shown in FIG. 3, a plurality of servo regions 31 each extending radially in a radial direction of the magnetic disk 11 from its center are formed at required angle intervals on the recording face of the magnetic disk 11. Also, a data region 32 is formed between two adjacent servo regions 31. The servo regions 31 and the data regions 32 are provided in alternate positions at a required angle. Servo data for controlling the positioning of the head 12 is recorded in each servo region 31. User data with added ECC and other data are recorded in each data region 32.

In addition, a plurality of tracks 33 each formed concentrically with a required width in the radial direction of the magnetic disk 11 are formed on the recording face thereof. Servo data and user data are recorded along the tracks 33. A plurality of data sectors (recording unit of user data) are included between two servo regions on one track 33. Since a spacing between the servo regions 31 is not an integer multiple of sector length, one data sector may be recorded in two split sections on the track 33, across the servo data recorded in either of the servo regions 31. Such data sectors are called split sectors.

Also, the tracks 33 are grouped into a plurality of zones according to a radial position of the magnetic disk 11. The number of sectors included in one track 33 is set for each zone. An example in which a recording face of the magnetic disk 11 is split into three zones is shown in FIG. 3.

Figure 4:
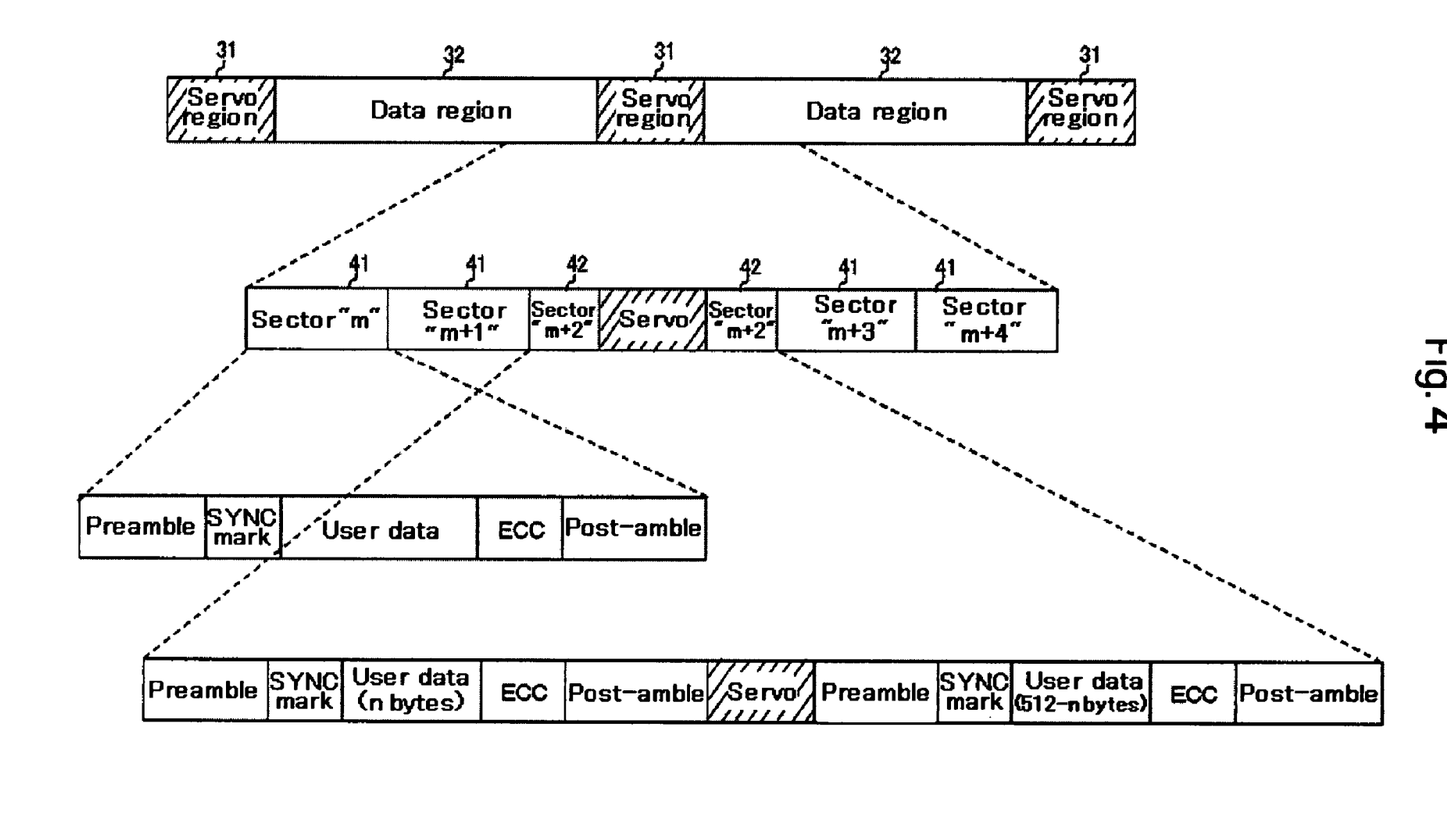
FIG. 4 shows a track format and a data-recording format of the magnetic disk in an embodiment of the present invention.

FIG. 4 shows a track format of the magnetic disk 11 and a data format of the data recorded on data sectors. As shown in FIG. 4, the servo regions 31 and the data regions 32 appear at alternate positions on the above-mentioned tracks 33. A plurality of data sectors 41 are included in the data region 32. Data in the data sectors 41 is constituted by a preamble, a SYNC mark, user data, an ECC, and a post-amble. Of these elements, the user data is data sent from the host 25 and has a fixed length of 512 bytes, for example. For a split sector, if "n" bytes of user data is recorded in a first-half section of the split sector, the remaining (512−n) bytes of data is recorded in a second-half section of the split sector.

As mentioned above, the ECC (Error Correction Code) is error correction data added by the HDC/MPU 23. The preamble, the SYNC mark, and the post-amble are data added by the R/W channel 21 during writing onto the magnetic disk 11. The preamble is a synchronizing signal used for readout, and the SYNC mark is data that identifies a header of the user data. The post-amble is the data required in decoding for reconstructing the user data and the ECC from read-out data during a readout operation.

Figure 5:
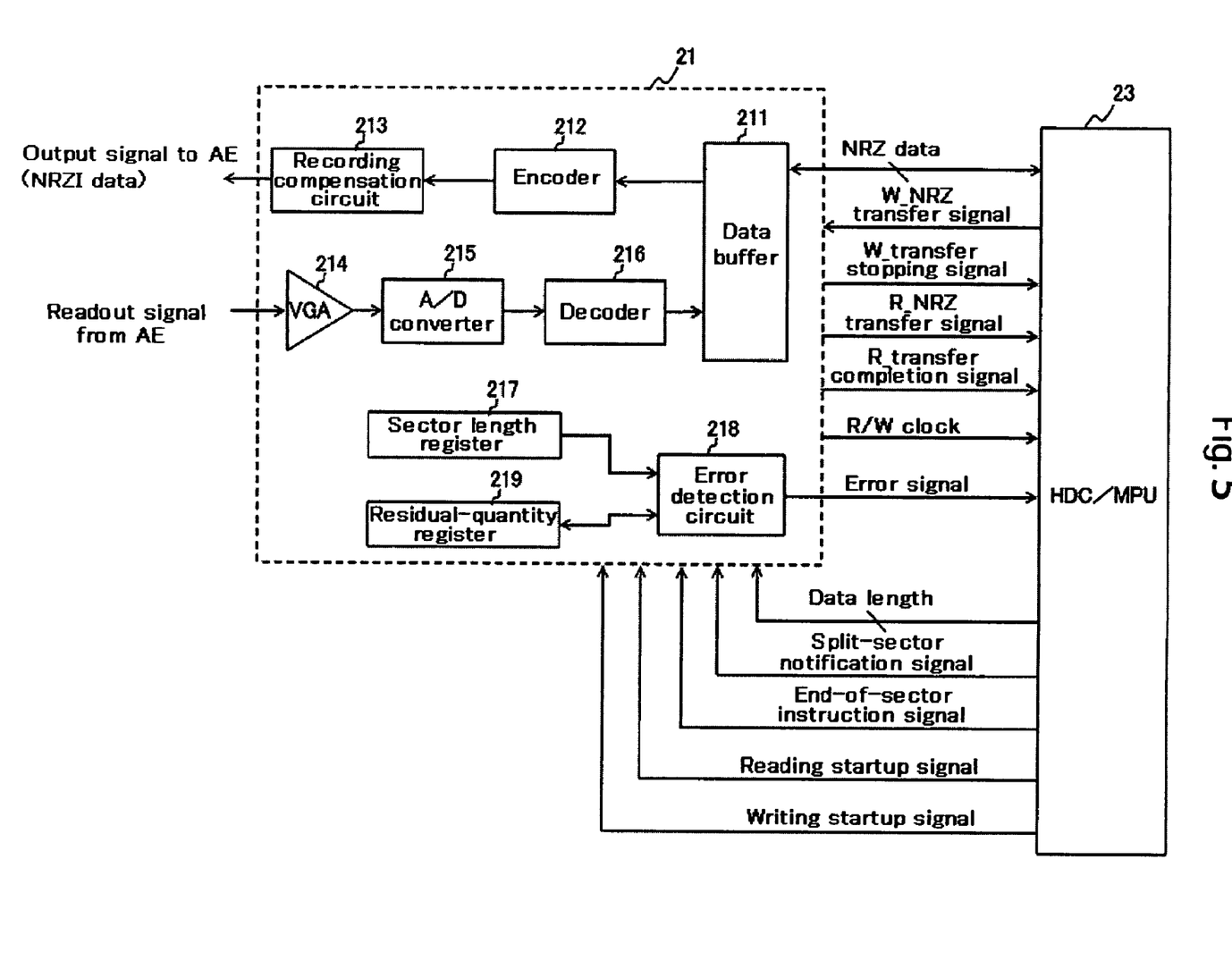
FIG. 5 shows a detailed configuration of the HDC/MPU and R/W channel used in the embodiment of the present invention.

Signal transfer between the HDC/MPU 23 and R/W channel 21 in the present embodiment is described in detail below using FIGS. 5 to 7. FIG. 5 shows a detailed configuration of the R/W channel 21 and the data and signals transferred between the HDC/MPU 23 and the R/W channel 21.

First, the detailed configuration of the R/W channel 21 is described using FIG. 5. A data buffer 211 is a buffer memory for storing the NRZ data transferred to/from the R/W channel 21. An encoder 212 performs an encoding process, a parallel-to-serial data conversion, an NRZI (Non-Return to Zero Inverse) signal conversion, and other processes, on the NRZ data stored in the data buffer 211. More specifically, the encoder 212 encodes (modulates) the NRZ data into a block code such as an RLL (Run Length Limited) code format to improve recording density, and further performs other processes such as precoding required for readout with a PR (Partial Response) method in order to compensate for the intercode interference occurring in readout signals. A recording compensation circuit 213 allows for NLTS (Non-Linear Transition Shift) and transfers to the AE 13 the NRZI signal output from the encoder 212.

A variable gain amplifier (VGA) 214, after receiving a readout signal from the AE 13, amplifies the readout signal to a required voltage and outputs the signal to the next stage. The readout signal from the VGA 214 is quantized by an A/D converter 215 and then input to a decoder 216. The decoder 216 restores the NRZ data to its original format by conducting Viterbi decoding and block code demodulation. The restored NRZ data is temporarily stored into the data buffer 211 and then transferred to the HDC/MPU 23 via the data buffer 211.

A sector length register 217 retains data length of the NRZ data written into one data sector 41. A residual-quantity register 219 retains a value obtained by subtracting the first-half NRZ data length of a split sector 42 that is notified from the HDC/MPU 23 when a read or write operation is performed on the split sector 42, from the value retained in the sector length register 217. In other words, the value retained in the residual-quantity register 219 is an expected value that is to be notified from the HDC/MPU 23 as the second-half NRZ data length of the split sector 42. An error detection circuit 218 verifies the data length notified from the HDC/MPU 23, and if the data length is wrong, outputs an error signal to the HDC/MPU 23. Processing in the error detection circuit 218 is described on later parts below.

Transfer of data between the HDC/MPU 23 and the R/W channel 21 when the data is to be written onto the magnetic disk 11 is described next. A W_NRZ transfer signal is used for the HDC/MPU 23 to notify the R/W channel 21 of a start of the data transfer. After sending the W_NRZ transfer signal, the HDC/MPU 23 outputs user data with an added ECC (i.e., NRZ data) to the R/W channel 21. The transfer of the NRZ data may use a parallel bus of about 10 bits, as in conventional technology.

If the data buffer 211 does not have a storage region large enough to accommodate the NRZ data that has been transferred from the HDC/MPU 23, the R/W channel 21 outputs a W_transfer stopping signal to the HDC/MPU 23 to request it to stop the data transfer. The HDC/MPU 23, after receiving the W_transfer stopping signal, stops the transfer of the NRZ data to the R/W channel 21. When the data buffer 211 becomes ready for accepting new data, the R/W channel 21 clears the output of the W_transfer stopping signal and the HDC/MPU 23 restarts to transfer the NRZ data. Repetition of this sequence makes it possible to transfer user data to be written onto the magnetic disk 11. Prior to output of a write instruction from the HDC/MPU 23 to the R/W channel, user data transfer to the R/W channel 21 is conducted allowing for a delay time in the encoding process performed by the encoder 212.

The above-described data transfer of data between the HDC/MPU 23 and the R/W channel 21 is based on an R/W clock generated by the R/W channel 21.

Next, a method is described in which internal processing of the R/W channel 21 is controlled from the HDC/MPU 23 when data is to be written onto the magnetic disk 11. The HDC/MPU 23, after recognizing that the head 12 has reached a desired writing position, outputs a writing startup signal to the R/W channel 21. The writing startup signal is a signal for instructing the R/W channel 21 to start writing transferred NRZ data. The HDC/MPU 23 further notifies data length of data to be written during the current write operation, to the R/W channel 21 through a parallel bus provided between the HDC/MPU 23 and the R/W channel 21.

The data length notified here from the HDC/MPU 23 to the R/W channel 21 may be data length of the NRZ data to be written during the current write operation. For example, if the user data sent from the host 25 is 512 bytes long, the data length notified may be that of the NRZ data with an ECC added at the 512th byte position. Since the R/W channel 21 retains lengths of the preamble, SYNC mark, and post-amble that the R/W channel 21 itself adds to the NRZ data, the R/W channel 21 can read out from the data buffer 211 the NRZ data of the data length notified from the HDC/MPU 23, and after performing an encoding process and the like, output the resulting data to the AE 13. The data length notified to the R/W channel 21 may be the NRZ data length itself, expressed in bytes, or may be an R/W clock count equivalent to the NRZ data length. In short, the data length notified needs only to be information that the R/W channel 21 to which the data length has been notified can use to recognize data length of NRZ data to be written.

A conventional WG signal may be used as the writing startup signal. In the present invention, since termination timing of the writing process by the R/W channel 21 is determined from the data length notified from the HDC/MPU 23, timing in which the WG signal becomes active has a meaning and timing in which the WG signal turns off does not need to match with termination timing of actual writing.

On receiving the writing startup signal, the R/W channel 21 starts processing such as encoding the NRZ data stored in the data buffer 211, and transfers to the AE 13 a writing signal equivalent to the notified data length.

If a split sector 41 is selected as a writing destination sector, the amount of NRZ data written in up to an immediate front section of a servo region 31 is notified from the HDC/MPU 23 to the R/W channel 21 as data length. Also, a split-sector notification signal is output to notify the R/W channel 21 that the sector is a split sector. The R/W channel 21, after recognizing the split sector from the split-sector notification signal, writes the NRZ data of the notified data length and waits for the next writing startup signal and data length notification. After passage through the servo region, the HDC/MPU 23 notifies reception of the writing startup signal and data length associated with a second-half section of the split sector, to the R/W channel 21. The R/W channel 21, after being notified of these, writes the second-half section of the split sector.

Furthermore, it is desirable that an end-of-sector instruction signal be sent from the HDC/MPU 23 to the R/W channel 21. The end-of-sector instruction signal is output in appropriate timing with the writing startup signal in order to notify the R/W channel 21 that the particular write operation is an end of data sector writing. Thus, the R/W channel 21 can recognize an end of the split sector 41 and perform processes such as error detection with the error detection circuit 218 described in detail later.

As described above, the R/W channel 21 can recognize a start of a split-sector write operation by using the split-sector notification signal output from the HDC/MPU 23, and recognize an end of the split-sector write operation by using the end-of-sector notification signal.

Figure 6:
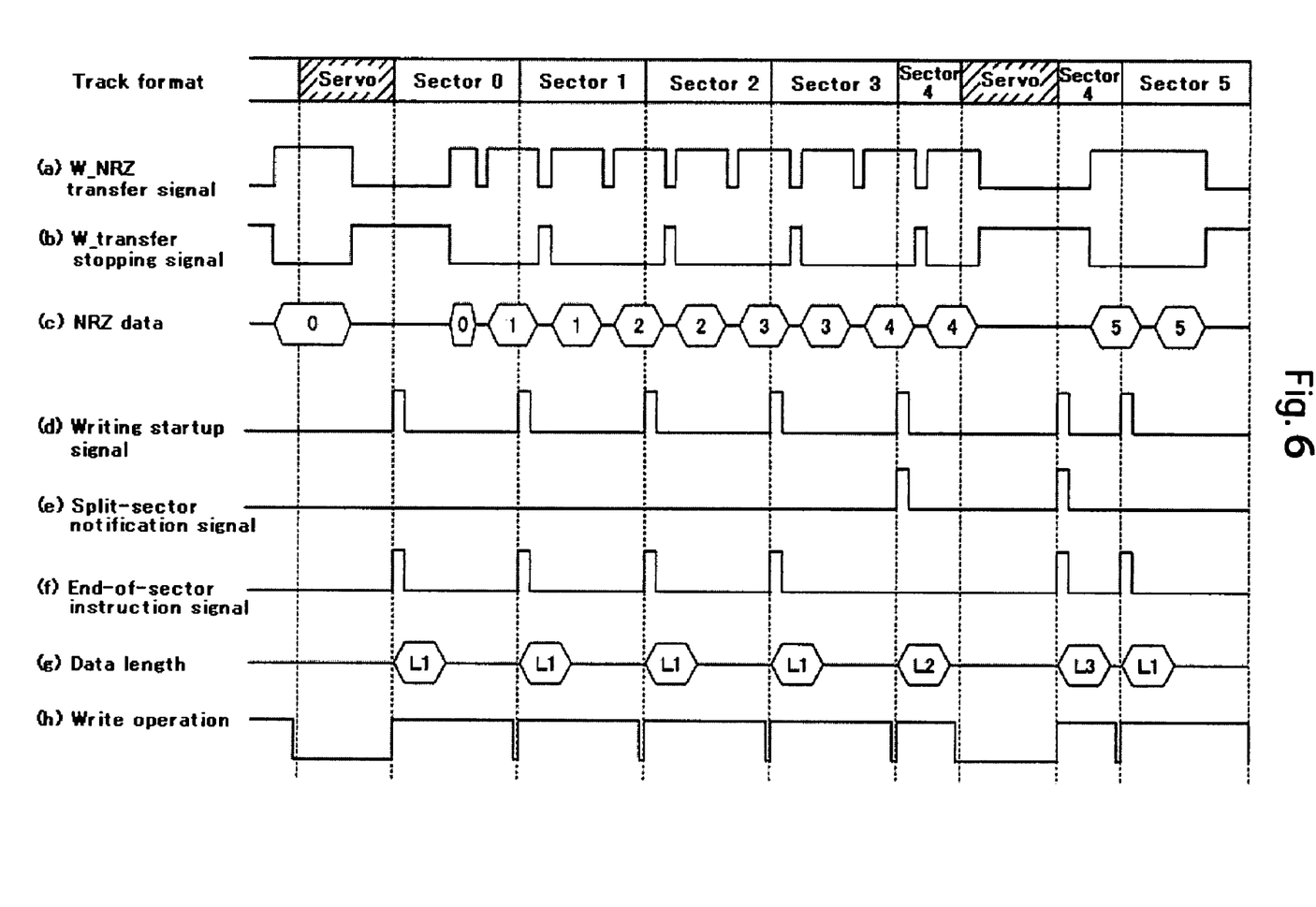
FIG. 6 is a timing chart of an HDD write operation according to an embodiment of the present invention.

A timing chart of the signals transferred between the HDC/MPU 23 and the R/W channel 21 during the above-described write operation is shown as FIG. 6. For example, if data is to be written into sector 0, which is the first sector of a user data region 32, NRZ data is transferred prior to writing into sector 0. A "High" state of the W_NRZ transfer signal shown as (a) in the figure indicates a transfer state of user data, and the data marked as "0" in NRZ data (c) is the user data written into sector 0. FIG. 6 also indicates that since W_transfer stopping signal (b) has been output from the R/W channel 21 during transfer of user data equivalent to sector 0, data transfer from the HDC/MPU 23 is temporarily interrupted.

After arrival at the writing position of sector 0, writing startup signal (d), end-of-sector instruction signal (f), and data length (g) are output from the HDC/MPU 23. Data length L1 here denotes one sector of NRZ data length. Since sector 0 is not a split sector, the R/W channel 21 performs a write process for the L1 length of user data. The write operation for user data equivalent to L1 is schematically represented as write operation (h).

Although the writing startup signal and data length are simultaneously output to the R/W channel 21 in FIG. 6, the HDC/MPU 23 does not need to output the signal and the data length at the same time. The R/W channel 21 that has started writing NRZ data in accordance with the writing startup signal needs only to be able to recognize how many bytes of data is to be written. For example, the data length may be output with a delay behind output timing of the writing startup signal.

When an available space region is generated in the data buffer 211 by a start of writing into sector 0, W_transfer stopping signal (b) is cleared (set to "Low"), whereby all remaining section of NRZ data equivalent to sector 0 is transferred from the HDC/MPU 23 to the R/W channel 21. Writing into sectors 1-3 and 5 is conducted similarly to that of sector 0.

The write process for sector 4, shown in FIG. 6, applies to writing into a split sector. This write process is similar to that of a non-split sector in that NRZ data is transferred prior to timing in which writing startup signal (d) becomes "High" for writing into sector 4. The above write process, however, differs from that of a non-split sector in that split-sector notification signal (e) becomes "High" in synchronization with writing startup signal (d), in that end-of-sector instruction signal (f) remains set to "Low", and in that data length (g) is a value of L2 equivalent to the data length of the NRZ data to be written into a first-half section of the split sector located in immediate front of the servo region 31.

When data is written into a second-half section of sector 4 following completion of passage through the servo region, split-sector notification signal (e) and end-of-sector instruction signal (f) become "High" in synchronization with writing startup signal (d). Also, data length L3 that indicates data length of the NRZ data to be written into a second-half section of the split sector of data length (g) is notified to the R/W channel 21 and the data is written into the second-half section of sector 4.

The amount of data written into one non-split data sector 41 is a constant value. More specifically, this value is a total value obtained by summing up the amount of user data, the ECC added by the HDC/MPU 23, and other data added by the R/W channel 21, such as the preamble and the SYNC mark. The preamble, SYNC mark, and other data added by the R/W channel 21 are stored within the R/W channel 21 beforehand. For a non-split sector, therefore, if the data length of one sector of NRZ data to be transferred from the HDC/MPU 23 to the R/W channel 21 is stored into the sector length register 217 thereof, this allows the R/W channel 21 to write one sector of data, without causing the HDC/MPU 23 to send the data length.

In this case, however, the R/W channel 21 needs, for non-split sectors, to refer to the sector length register 217 and write NRZ data, or for split sectors, to write NRZ data in accordance with the data length output from the HDC/MPU 23. From a viewpoint of simplifying internal processing of the R/W channel 21, therefore, it is valid to adopt circuit composition in which, irrespective of whether the sectors are split ones, the data length of the NRZ data to be written is sent for each sector.

Error detection for preventing erroneous writing is described next. If the data length notified from the HDC/MPU 23 to the R/W channel 21 is in excess of one sector of NRZ data length, execution of a write process by the R/W channel 21 according to the notified data length will overwrite and destroy existing data. It is desirable, therefore, that the R/W channel 21 should detect such an error and stop the write process.

A specific example of such a write-stopping process is described below. For example, for non-split sectors, the value indicating the data length of one sector that was retained in the sector length register 217, and the data length that was received from the HDC/MPU 23 may be compared with each other in the error detection circuit 218. If these values do not match each other, the corresponding data may not be written and an error signal may be output to the HDC/MPU 23. The HDC/MPU 23 that has received the error signal may then output data length of NRZ data to be newly written, and write the data, only after confirming that the data length matches the value retained in the sector length register 217.

Alternatively, the write process may be stopped when a write abort signal indicating the stop of the write process is output from the HDC/MPU 23 that has received the error signal, to the R/W channel 21.

When the sector is a split sector (i.e., when the split-sector notification signal is set to "High"), if a value exceeding one sector of NRZ data length is notified, an error signal is output to the HDC/MPU 23, as in the above case. Conversely, if a value smaller than one sector of NRZ data length is notified, the type of process performed differs depending on whether the writing position is the first-half section of the split sector (the end-of-sector instruction signal is set to "Low") or the second-half section (the end-of-sector instruction signal is set to "High"). If the writing position is the first-half section of the split sector (the split-sector notification signal is set to "High" and the end-of-sector instruction signal is set to "Low"), the R/W channel 21 writes the notified amount of data. Also, the R/W channel 21 retains in the residual-quantity register 219 the unwritten-data length obtained by subtracting the notified data length from one sector of NRZ data length, and waits for the next writing startup signal and data length notification. If the writing position is the second-half section of the split sector (both the split-sector notification signal and the end-of-sector instruction signal are set to "High"), the R/W channel 21 compares the data length notified from the HDC/MPU 23 with the value retained in the residual-quantity register 219. The R/W channel 21 writes the notified amount of data if comparison results indicate that a total value of the notified data length of one sector is normal (i.e., in cases such as those where the compared values match each other or where the value derived by subtracting the data length in the second-half section of the split sector from the value of the residual-quantity register 219 is zero). The error detection circuit 218 outputs an error signal if the total value of the notified data length of one sector is abnormal.

In this manner, the R/W channel 21 recognizes the beginning and end of split sectors by means of the split-sector notification signal and the end-of-sector instruction signal and detects an error in the data length notified from the HDC/MPU 23. Erroneous writing that results in successive data sector being overwritten can therefore be prevented when data is written into the split sectors.

In the above description, the value retained in the sector length register 217 is defined as the data length of the NRZ data written into one data sector 41. This is because, when the data length notified from the HDC/MPU 23 to the R/W channel 21 is to be taken as the data length of the NRZ data, such a definition is suitable for comparison with the notified data length. For this reason, the type of value retained in the sector length register 217 is not limited to one sector of NRZ data, and that value may be retained as a value comparable with data length notified to the R/W channel 21.

A method in which internal processing by the R/W channel 21 is controlled from the HDC/MPU 23 when data is to be read out from the magnetic disk 11 is described below. The HDC/MPU 23, after recognizing that the head 12 has reached a desired readout position, outputs a reading startup signal to the R/W channel 21. The reading startup signal is a signal for instructing the R/W channel 21 to start reading out data from the magnetic disk 11. The HDC/MPU 23 further notifies data length of NRZ data to be read out during the current readout operation, to the R/W channel 21.

This control method is the same as the above-described control method for data writing onto the magnetic disk 11 in terms of the following. If the data is to be read out from a split sector, the HDC/MPU 23 outputs the split-sector notification signal, and if the data is to be read out from a non-split data sector, the HDC/MPU 23 outputs the end-of-sector instruction signal. The R/W channel 21 can thus recognize the beginning of split sectors by means of the split-sector notification signal output from the HDC/MPU 23, and the end of the split sectors by means of the end-of-sector instruction signal. In such circuit composition, NRZ data can be output to the HDC/MPU 23 in units of one sector, even for split sectors, as described later. Also, similarly to the writing control method, the error detection circuit 218 can detect an error in the data length notified from the HDC/MPU 23.

A conventional RG signal may be used as the reading startup signal. In the present invention, since termination timing of readout by the R/W channel 21 is determined from the data length notified from the HDC/MPU 23, timing in which the RG signal becomes active has a meaning and timing in which the RG signal turns off does not need to match with termination timing of actual readout.

After receiving the reading startup signal, the R/W channel 21 receives a readout signal from the AE 13, restores NRZ data through the VGA 214, a waveform equalizer (not shown), the A/D converter 215, and the decoder 216, and stores the restored NRZ data into the data buffer 211.

Transfer of the NRZ data that was read out from the magnetic disk 11, between the HDC/MPU 23 and the R/W channel 21, is described next. Transfer of the NRZ data is started by transmission of the R_NRZ transfer signal from the R/W channel 21 to the HDC/MPU 23. The NRZ is transferred through the same bus as used for writing.

After transferring one sector of data, the R/W channel 21 outputs an R_transfer completion signal to the HDC/MPU 23 to notify thereto that one sector of data transfer instructed thereby has been completed. The HDC/MPU 23, after receiving the R_transfer completion signal, confirms the amount of data that has been transferred as one sector of data. If the transferred amount of data is correct, the HDC/MPU 23 advances to next operation. If the transferred amount of data is wrong, the HDC/MPU 23 re-performs the readout operation on that sector. Repetition of this operation sequence enables readout data from the magnetic disk 11 to be transferred from the R/W channel 21 to the HDC/MPU 23.

Figure 7:
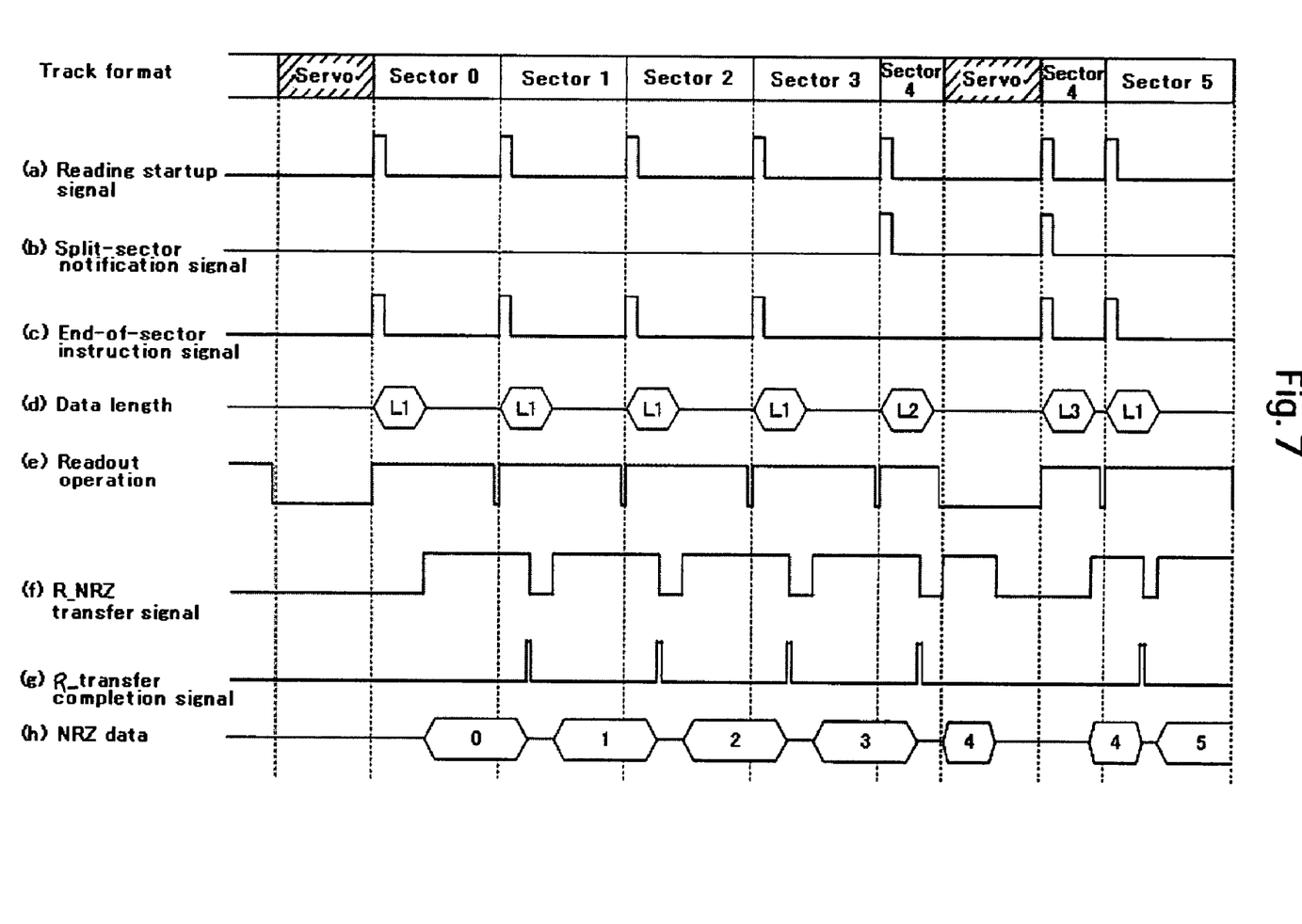
FIG. 7 is a timing chart of an HDD readout operation according to an embodiment of the present invention.

A timing chart of the signals transferred between the HDC/MPU 23 and the R/W channel 21 during the readout operation is shown in FIG. 7. If data is to be read out from sector 0, which is the first sector of a user data region 32, when the head 12 arrives at the beginning of sector 0, reading startup signal (a) and end-of-sector instruction signal (c) are set to "High" and a data length value (d) of L1 is notified. Since sector 0 is not a split sector, the data length value (d) of L1 is one sector of NRZ data length. Although the reading startup signal, the end-of-sector instruction signal, and the data length are simultaneously output to the R/W channel 21 in FIG. 7, the HDC/MPU 23 does not need to output the signals and the data length at the same time.

The R/W channel 21, after receiving the reading startup signal, accesses the magnetic disk 11 and processes a readout signal to restore the L1 length of NRZ data. After this, when the R/W channel 21 becomes ready for transferring the restored NRZ data to the HDC/MPU 23, R_NRZ transfer signal (f) is set to "High" and the NRZ data is transferred to the HDC/MPU 23. The R/W channel 23 further outputs R_transfer completion signal (g) to notify to the HDC/MPU 23 that the transfer of one sector of NRZ data has been completed. Reading from sectors 1-3 and 5 is conducted similarly to that of sector 0.

If data is to be read out from sector 4 that is a split sector, split-sector notification signal (b) becomes "High" for a first-half section of the split sector in synchronization with setting of reading startup signal (a) to "High" and data length (d) is set to be a value of L2 equivalent to the data length of the NRZ data included in the first-half section of the split sector. End-of-sector instruction signal (c) remains set to "Low". The R/W channel 21 can recognize the first-half section of the split sector by confirming that a state of split-sector notification signal (b) is "High" and that of end-of-sector instruction signal (c) is "Low". Transfer of the thus-read data length L2 of NRZ data to the HDC/MPU 23 can thus be suspended until the end of the split sector has been reached.

For a second-half section of the split sector, split-sector notification signal (b) becomes "High" in synchronization with setting of reading startup signal (a) to "High", end-of-sector instruction signal (c) is set to "High", and data length (d) is set to be a value of L3 equivalent to data length of the NRZ data included in the second-half section of the split sector. Similarly to the write operation described using FIG. 6, split-sector notification signal (b) is set to "High" for readout from the split sector (sector 4).

The R/W channel 21 can recognize the beginning and end of split sectors by means of the split-sector notification signal and end-of-sector instruction signal, respectively, that are output from the HDC/MPU 23. Even for split sectors, therefore, NRZ data can be output to the HDC/MPU 23 for each sector.

In addition, since the data length notified from the HDC/MPU 23 prior to readout from non-split sectors is constant (L1), the readout operation is similar to the above-described write operation in that circuit composition in which data length is not notified, except for split sectors, can be adopted.

Furthermore, similarly to writing, if the data length notified from the HDC/MPU 23 is wrong, the R/W channel is adapted to output an error signal and stop the readout operation. For non-split sectors, the error detection circuit 218 can be used to detect a data length error by comparing the retained value within the sector length register 217 that indicates one sector of NRZ data, with the data length received from the HDC/MPU 23. Moreover, since the R/W channel 21 uses the split-sector notification signal and the end-of-sector instruction signal to recognize the end of split sectors, using the residual-quantity register 219 allows the error detection circuit 218 to detect a data length error, even for split sectors, by comparing the data length notified before the end of the split sectors is recognized, with the value indicating one sector of NRZ data length.

The MPU/HDC 23 and R/W channel 21 according to the present embodiment described above may have all respective functional blocks integrated into one bare chip using SoC (System on a Chip) technology. Thus, since wiring between the R/W channel 21 and the HDC/MPU 23 functions as internal wiring of LSI, limitations on increasing the quantity of wiring are greatly alleviated, compared with those applied to constructing both sections as independent ICs. Accordingly, it becomes easier to provide the wiring required for transfer of the data and signals relating to the present invention, such as the parallel bus for data length transfer.

In the configuration of the HDD 1 according to the present embodiment described above, for example, for a write process, the R/W channel 21 can use the W_NRZ transfer signal and the W_transfer stopping signal to perform the write process by assigning a preamble and other additional data to, among all NRZ data that has been transferred to the R/W channel 21, only NRZ data of the data length notified from the HDC/MPU 23. That is to say, the R/W channel 21 can autonomously determine termination timing of writing onto the recording disk 11, independently of the timing signal, such as write start signal, that is sent from the HDC/MPU 23.

For a readout process, in accordance with the NRZ data length notified from the HDC/MPU 23, the R/W channel 21 can read out, from the magnetic disk 11, data that indicates the amount of data including the preamble and other additional data assigned to the data length. That is to say, the R/W channel 21 can autonomously determine termination timing of readout from the recording disk 11, independently of the timing signal, such as read start signal, that is sent from the HDC/MPU 23.

Accordingly, normal writing onto the magnetic disk 11 can be implemented, even if data transfer between the HDC/MPU 23 and the R/W channel 21 and the write/read operation performed on the magnetic disk 11 by the R/W channel 21 do not match each other in timing and thus a writing error occurs during conventional writing control with a Write Gate (WG) signal.

In the embodiment described above, when both writing and reading are to be executed, the amount of data is notified from the HDC/MPU 23 to the R/W channel 21. In a drive for which only writing or reading is to be executed, the amount of data may be notified from the HDC/MPU 23 to the R/W channel 21, only for writing or reading.

The present invention is not limited only to the above-described embodiment and it goes without saying that various modifications can be performed without departing from the scope of the invention. In the above-described embodiment, application of the present invention to an HDD whose recording disk is a magnetic disk has been described. However, similarly to the HDD, the present invention is applicable to any other data storage device that does not match in timing between data transfer from a controller equivalent to an HDC, to a channel equivalent to an R/W channel, or vice versa, and the write/read operation performed by the channel.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage device comprising:
   a head for accessing a recording disk in order to write data to be recorded on the disk and/or read out recorded data therefrom;
   a channel configured to exchange the recorded data with said head and perform a data conversion on the recorded data; and
   a controller configured to exchange the recorded data with said channel and control an exchange of the recorded data between said channel and said head;
   wherein said controller outputs a starting instruction for a data exchange with said head, and data that indicates data length of the recorded data to be exchanged, to said channel; and
   in response to the data transfer starting instruction from said controller, said channel starts exchanging with said head the recorded data of the data length specified in the data for an amount of time corresponding to the data length output from the controller;

wherein the exchanging of recorded data is stopped independently of the starting instruction.

2. The data storage device according to claim 1, wherein the data that indicates data length specifies data length of the recorded data to be transferred between said controller and said channel via parallel signal lines, the recorded data being transferred via parallel signal lines provided between said controller and said channel.

3. The data storage device according to claim 1, wherein, when said controller accesses split sectors in which the recorded data is recorded as a plurality of split sets of data, said controller outputs the data that indicates data length, for each split set of data independently.

4. The data storage device according to claim 1, wherein said controller outputs the data to said channel each time said controller outputs the starting instruction to said channel.

5. The data storage device according to claim 1, wherein said channel detects an error in the data length specified in the data that indicates data length, and notifies the data length error to said controller.

6. The data storage device according to claim 5, wherein, on the basis of the data length error notification from said channel, said controller gives an instruction for stopping a transfer of the recorded data to said head.

7. The data storage device according to claim 1, wherein, when said controller accesses split sectors in which the recorded data is recorded as a plurality of split sets of data, said controller outputs a split-sector notification signal to said channel.

8. The data storage device according to claim 1, wherein, when said controller accesses split sectors in which the recorded data is recorded as a plurality of split sets of data, said controller outputs to said channel a signal indicative of the last set of data out of the plural sets of data.

9. The data storage device according to claim 1, wherein said controller and said channel are integrated into a single bare chip.

10. A data storage control circuit, comprising:
a channel that exchanges with a head for accessing a recording disk in order to write data to be recorded on the disk and/or read out recorded data therefrom, and performs a data conversion on the recorded data; and
a controller that exchanges the recorded data with said channel and controls an exchange of the recorded data between said channel and the head;
wherein said controller outputs a starting instruction for a data exchange with the head, and data that indicates data length of recorded data to be exchanged, to said channel; and
in response to the data transfer starting instruction from said controller, said channel starts exchanging with said head the recorded data of the data length specified in the data for an amount of time corresponding to the data length output from the controller;
wherein the exchanging of recorded data is stopped independently of the starting instruction.

11. The data storage control circuit according to claim 10, wherein, when said controller accesses split sectors in which the recorded data is recorded as a plurality of split sets of data, said controller outputs the data that indicates data length, for each split set of data independently.

12. The data storage control circuit according to claim 10, wherein said channel detects an error in the data length specified in the data that indicates data length, and notifies the data length error to said controller.

13. The data storage control circuit according to claim 10, wherein, when said controller accesses split sectors in which the recorded data is recorded as a plurality of split sets of data, said controller outputs a split-sector notification signal to said channel.

14. The data storage control circuit according to claim 10, wherein, when said controller accesses split sectors in which the recorded data is recorded as a plurality of split sets of data, said controller outputs to said channel a signal indicative of the last set of data out of the plural sets of data.

15. The data storage control circuit according to claim 10, wherein said controller and said channel are integrated into a single bare chip.

16. A method for controlling a magnetic disk drive including a head for accessing a magnetic disk in order to write data to be recorded on the disk and/or read out recorded data therefrom; a channel configured to exchange the recorded data with the head and perform a data conversion on the recorded data; and a controller configured to exchange the recorded data with the channel and controlling an exchange of the recorded data between the channel and the head, said method comprising:
outputting data that indicates data length of recorded data to be exchanged, together with a starting instruction for a data exchange with the head, from the controller to the channel; and
allowing the channel responsive to the data transfer starting instruction from the controller to start exchanging with the head the recorded data of the data length specified in the data for an amount of time corresponding to the data length output from the controller;
wherein the exchanging of recorded data is stopped independently of the starting instruction.

17. The method for controlling a magnetic disk drive according to claim 16, further comprising, when the channel detects an error in the data length specified in the data that indicates data length, receiving by the controller notification of the data length error from the channel.

18. The method for controlling a magnetic disk drive according to claim 17, further comprising, on the basis of the data length error notification from the channel, giving an instruction by the controller for stopping a transfer of the recorded data to the head.

19. The method for controlling a magnetic disk drive according to claim 16, further comprising, when the controller accesses split sectors in which the recorded data is recorded as a plurality of split sets of data, outputting to said channel the starting instruction and the data that indicates data length on the plurality of split sets basis.

20. The method for controlling a magnetic disk drive according to claim 16, further comprising, when the controller accesses split sectors in which the recorded data is recorded as a plurality of split sets of data, outputting the data that indicates data length, for each split set of data independently.

* * * * *